United States Patent [19]

Huang

[11] 4,275,759

[45] Jun. 30, 1981

[54] CLOSURE MEMBER

[76] Inventor: Shih C. Huang, No. 1, Chung-Shon S. Rd., Taipei, Taiwan

[21] Appl. No.: 43,150

[22] Filed: May 29, 1979

[51] Int. Cl.³ ............................................. F16K 15/02
[52] U.S. Cl. ................................ 137/528; 137/533.19; 251/65
[58] Field of Search ............. 137/528, 533.19, 543.19; 251/65

[56] References Cited

U.S. PATENT DOCUMENTS

| 966,390 | 8/1910 | Elder | 137/533.19 X |
| 2,646,071 | 7/1953 | Wagner | 137/528 |
| 2,800,142 | 7/1957 | Champion | 137/543.19 |
| 3,076,417 | 2/1963 | Rhodes | 137/528 X |

Primary Examiner—Robert G. Nilson

[57] ABSTRACT

A closure member comprises a casing having a plurality of stripe recesses as fluid passages, a valve seat inserted in said casing having a flange portion for sleeving a ring magnet and a high strength material adopted on the flange portion, a piston made of metal or magnetic material to be attracted by the ring magnet, an inner tube inserted in said casing having a central fluid passage, a plurality of supports for positioning the piston and a plurality of stripe protrusions coincident with the stripe recesses of the casing and a base cover attaching to the casing.

5 Claims, 3 Drawing Figures

U.S. Patent  Jun. 30, 1981  4,275,759
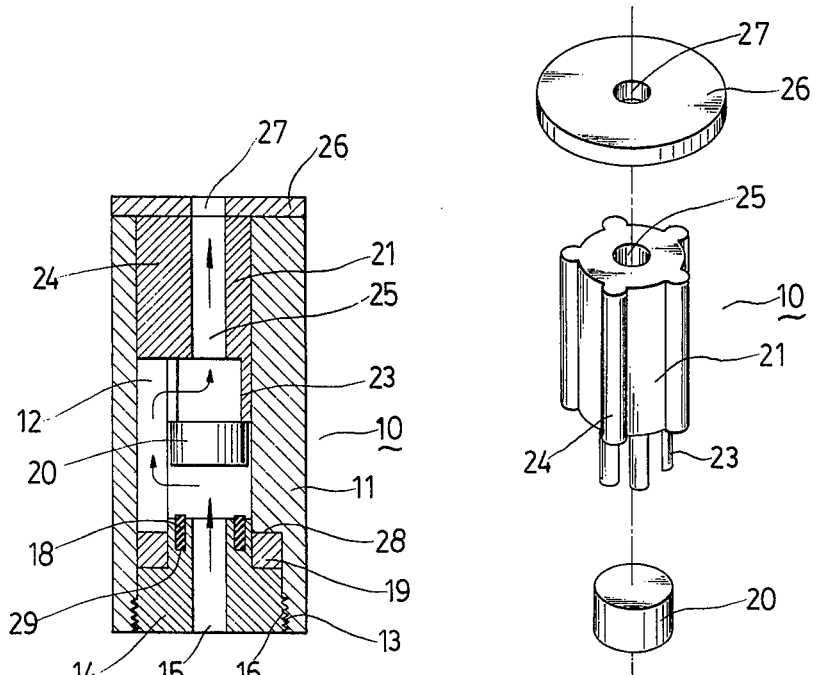
Fig. 3
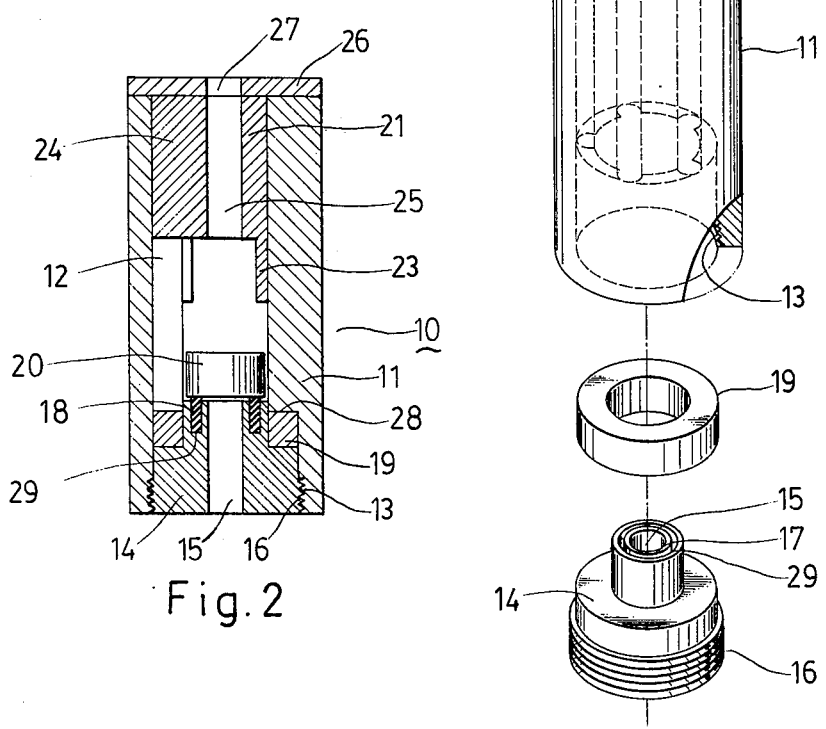
Fig. 2
Fig. 1

CLOSURE MEMBER

BACKGROUND OF THE INVENTION

1. Field of the Invention

The present invention relates to a fluid actuating closure member which has a ring magnet cooperating with a piston which may be made of magnetic materials.

2. Brief Description of the Prior Art

There have been many kinds of closure members utilized in the industry field. Most of these conventional closure members are made of metal or other rigid materials with high hardness. Besides, the operation of these closure members depends on a certain driving mechanism. Furhter, the structure of the conventional closure member for use in the place of high temperature or high pressure is very much complicated.

BRIEF SUMMARY OF THE INVENTION

It is the main object of the present invention to provide a novel closure member which is operated by the fluid passing through itself without any external driving mechanism.

The other object of the present invention is to provide a closure member having a very simple structure for use in many fields of the industry.

Still another object of the present invention is to provide a closure member made of non-metal materials but suitable for use in the high temperature or high pressure places.

According to the present invention, the closure member comprises a cylindrical casing having a plurality of stripe recesses formed on the inner surface thereof for used as fluid passages, a ring magnet sleeved on a valve seat, a piston made of metal or magnetic materials to be attracted by the ring magnet, an inner tube member adopted in said casing having a central fluid passage a pluraity of supports for positioning the piston and a plurality of stripe protusions stopping the casing from fluid leakage and a base cover attaching to the casing.

BRIEF DESCRIPTION OF THE DRAWINGS

Those and other objects, features, and advantages of the present invention will become apparent from the following detailed description of the preferred embodiment with reference to the accompanying drawings.

FIG. 1 is an exploded perspective view of the closure member according to the present invention;

FIG. 2 is a sectional view of the closure member according ot the present invention; and FIG. 3 is a sectional view of the closure member according to the present invention showing the piston in a released condition for passing the fluid.

DETAILED DESCRIPTION OF THE PREFERRED EMBODIMENT

Referring to FIG. 1 which shows an exploded perspective view of the closure member of the present invention, with reference to FIG. 2 the closure member 10 comprises a cylindrical casing 11 which has a plurality of strip resesses 12 formed on the inner surface thereof used as fluid passages, and a section of female threads 13 formed on the lower portion of the inner surface of the casing 11. A valve seat 14 substantially in a ring shape comprises a central fluid passage 15, a male threads 16 formed on part of the outer surface of the valve seat 14 for engaging with the female threads 13 in the casing 11 during assembling, and a flange portion 17 projecting from the upper surface having a high strength material 18 envolved therein. The material 18 is inserted in a ring slot 29, and can be changed for fitting different application. A ring magnet 19 is sleeved onto the flange portion 17 of the valve seat 14. It is to be noted that the ring magnet 19 can be imbedded in a ring made of non-metal materials. The ring magnet 19 is caped by the inner surface 28 of the casing 11 and thus isolated from the fluid in the fluid passage. A piston 20 is movably inserted in the casing 11 and will be attracted by the attracting force of the ring magnet 19 to close the fluid passage 15 of the valve seat 14. The piston 20 may also be made of magnetic materials for enhancing the magnetic attracting effect. An inner tube 21 has a diameter equal to the inner diameter of the casing 11 and will be inserted into the casing 11 from the top opening 22 thereof. The inner tube 21 comprises a plurality of supports 23 extending from the bottom surface thereof for positioning the piston 20 and a plurality of stripe protrusions 24 coincident with the stripe recesses 12 of the casing 11 when the inner tube 21 is inserted into the casing 11. The inner tube 21 also has a central fluuid passage 25 for conducting the fluid. A base cover 26 having a central opening 27 is attached to the casing 11 after the inner tube 21 is inserted.

In operation, please refer to FIGS. 2 and 3 which show the sectional views of the closure member according to the present invention. The closure member 10 is fitted on the fluid entrance of a certain container. Under normal condition, the piston 20 of the closure member 10 is attracted by the ring magnet 19 to close the fluid passage 15 of the valve seat 14. It is to be noted that the piston 20 does not touch the ring magnet 19 nor the flange portion 17 of the valve seat 14 but in touch with the high strength material 18. By properly choosing the material 18, the closure member 10 may be used in a high temperature place or a high pressure place without damages.

If the fluid is entered from the fluid passage 15 and the fluid pressure is hgher than the attracting force between the ring magnet 19 and the piston 20, the piston 20 wil be pushed back and the fluid stream will move along the direction as shown by the arrow in FIG. 3. Once the fluid in the container has reached to a certain degree and no more fluid is entered from the fluid passage 15 of the closure member 10, the piston 20 will again be attracted by the ring magnet and restores to its original position to close the fluid passage 15.

It is summarized that the closure member according to the present invention may be used as a high temperature or high pressure closure member. Besides, if non-metal materials are chosed for making the casing, the valve seat, the inner tube, the base cover and the piston is envoloped also in a non-metal material, then the closure member can be applied to the utilization of switches in the solar energy water heater which is usually made of non-metal or plastics. Because the valve seat is threaded into the casing, it is therefore very easy for substituting the high strength material 18 for different fluid applications.

What is claimed is:

1. A closure member comprising:
   a cylindrical casing having a plurality of stripe recesses formed on the inner surface thereof and a section of female threads formed on the lower portion of the inner surface thereof;

a valve seat having a central passage, a male threads being formed on part of the outer surface thereof for engaging with said female threads on the casing and a flange portion projecting from the upper surface of the valve seat;

a ring magnet sleeved on the flange portion of said valve seat;

a piston movably positioned in the casing and biased toward said valve seat by the magnetic force of said ring magnet;

an inner tube having a plurality of supports extending from the bottom surface thereof for positioning the piston and a plurality of stripe protrusions coincident with the stripe recesses in the casing; and a base cover for assembling the inner tube having a central openiing formed thereon.

2. A closure member as claimed in claim 1 wherein said valve seat further comprises a body of high strength material disposed in a ring slot in the flange portion of said valve seat.

3. A closure member as claimed in claim 2, wherein said high strength material has an annual configuration and is inserted into said slot.

4. A closure member as claimed in claim 1 wherein said ring magnet sleeved on the flange portion of the valve seat has a height smaller than the height of the flange portion, whereby said piston is mechanically isolated from the ring magnet.

5. A closure member as claimed in claim 1 wherein said ring magnet sleeved on said flange portion of the valve seat is isolated from contact with the fluid.

* * * * *